United States Patent [19]

Beaujean

[11] Patent Number: 4,543,225

[45] Date of Patent: Sep. 24, 1985

[54] METHOD AND SYSTEM FOR REPRODUCING RELIEF STRUCTURES ONTO A SUBSTRATE

[75] Inventor: Joseph M. E. Beaujean, Grubbenvorst, Netherlands

[73] Assignee: Docdata N.V., Venlo, Netherlands

[21] Appl. No.: 629,219

[22] Filed: Jul. 10, 1984

[51] Int. Cl.⁴ .............................................. B30B 11/14
[52] U.S. Cl. .................... 264/167; 425/363; 425/373; 425/808; 425/810
[58] Field of Search .................. 264/167, 176 R, 1.3, 264/1.7; 425/363, 373, 808, 810

[56] References Cited

U.S. PATENT DOCUMENTS

| | | | |
|---|---|---|---|
| 3,241,182 | 3/1966 | Kessler | 425/373 X |
| 3,246,365 | 4/1966 | Kloender | 425/373 X |
| 3,265,776 | 8/1966 | Henkes | 264/1.3 X |
| 3,507,939 | 4/1970 | Williams et al. | 264/176 R |
| 3,860,382 | 1/1975 | Skiller et al. | 425/810 X |
| 3,873,255 | 3/1975 | Kalwaites | 425/363 X |
| 3,874,836 | 4/1975 | Johnson et al. | 425/810 X |
| 3,893,795 | 7/1975 | Nauta | 425/363 X |
| 4,211,743 | 7/1980 | Nauta et al. | 425/363 X |
| 4,290,248 | 9/1981 | Kemerer et al. | 264/167 X |
| 4,312,823 | 1/1982 | Kraakman et al. | 425/810 |
| 4,395,211 | 7/1983 | Broeksema et al. | 425/810 |

*Primary Examiner*—J. Howard Flint, Jr.
*Attorney, Agent, or Firm*—Handal & Morofsky

[57] ABSTRACT

Method for reproducing relief structures onto a substrate, whereby between a die surface comprising holes or protuberances corresponding to the negative shape of the relief to be reproduced, and a substrate a hardenable liquid is deposited. After depositing the die surface and the substrate are at least locally forced together whereby the respective section of the die surface does not move in relation to the substrate in any other direction than perpendicular to the contact surface. During the following hardening of said liquid there is no mutual movement between the die surface and the substrate both of which remain forced together with a pressure which is smaller than the pressure during the initial pressing stage. The substrate and the die surface are separated after the liquid is hardened. There are significant differences in the chemical or physical parameters which have influence onto the hardening process between those liquid parts forming the higher relief parts and those liquid parts forming the lower relief parts.

21 Claims, 3 Drawing Figures

METHOD AND SYSTEM FOR REPRODUCING RELIEF STRUCTURES ONTO A SUBSTRATE

The invention relates to a method for reproducing relief structures onto a substrate, whereby between a die surface comprising holes or protuberances corresponding to the negative shape of the relief to be reproduced and the substrate a hardenable liquid is deposited, whereafter the die surface and the substrate are at least locally forced together, whereby the respective section of the die surface does not move in relation to the substrate in any other direction than perpendicular to the contact surface, whereafter the hardenable liquid hardens during which process there is no mutual movement between the die surface and the substrate, both of which remain forced together with a pressure which is smaller than the pressure during the initial pressing stage, and the substrate and die surface are separated after the liquid is hardened. Furthermore, the invention relates to a system for carrying out such a method.

A method of this type is e.g. described in the U.S. Pat. No. 3,265,776. In this known process a die in the shape of a web is used, which web is pressed against the substrate carrying the hardenable liquid using a roller. Thereafter the substrate and the die, maintained together, are wound onto a reel to let the liquid harden during a predetermined period. Thereafter the substrate with the at least partly hardened liquid layer is removed from the die surface.

Problems are encountered in methods of this type especially when removing the hardened liquid layer, adhering to the substrate, is removed out of the die. For a good reproduction of the die relief structure it is necessary to bring the liquid layer between the die and substrate in intense contact with the die surface by pressing the substrate and die together. The result thereof, however, might be that when the substrate with the thereto adhering hardened and relief shaped liquid layer is removed from the die, parts of this hardened liquid layer will remain into the die or parts of the relief structure of the die will be removed together with the hardened liquid layer. Not only the quality of the reproduction respectively of the die surface decreases, also the quality of further reproductions will be influenced very disadvantageously, and furthermore, the life of the die surface will be reduced.

This problem plays a more important role if the dimensions of the relief structure part become smaller. Especially in microstructures of which the relief depths and/or the spacial resolution is not larger than $100\mu$, and more especially not larger than 1 micron, the incorrect releasing of the reproduction from the die will result into a serious deterioration of the reproduction accuracy respectively the life of the die. Examples of surfaces with structures of this type are: gratings for spectroscopical measurements; flat lenses such as Fresnel-lenses, long-play records; optical audio and video discs and digital-optical tapes.

In the abovementioned U.S. patent it is only indicated that the reproduction is released from the die before the hardening liquid layer adheres too strongly to the die surface. The disadvantage thereof is, however, that the not completely hardened liquid layer is very sensitive for damages and will be subjected to shape alterations (shrinkage) during the further hardening period.

In the Dutch patent application No. 78,11395 a similar method is described used for discontinuously fabricating reproductions of a die surface. A liquid resin, hardenable by radiation, is deposited onto the die surface and covered by a substrate which is transparent for said radiation. Thereafter the resin will be hardened under the influence of radiation impinging through the substrate and after hardening the resulting reproduction is released from the die. In this publication the combination of a metal die surface, a resin of special composition, hardening by means of radiation, and a radiation transparant substrate are vital. It is clear that this problem is not solved completely in all cases by using this combination.

In the European patent application No. 0.015.834 also a similar method is described especially for fabricating video discs. In this publication a resin is discussed which may not adhere to the die and furthermore it is indicated that preferably a metal die surface should be used. A final solution for the releasing problem, however, is not described in this publication.

An object of the invention is now to indicate in which way the release of a prepared reproduction and correspondingly therewith the accuracy of the reproduction can be improved and how the life of the die can be extended.

According to the invention a good reproduction of the mentioned relief structures can be obtained and simultaneously a long life of the die surface can be realized with the method mentioned in the preamble if between the liquid sections forming the higher relief parts and the liquid sections forming the lower relief parts there are significant differences in the chemical or physical parameters which are influencing the hardening process. The parameters may for instance be the thickness, the temperature or the chemical composition of the respective liquid parts, or the radiation intensity in the case of liquids which are radiation hardenable.

Preferably, the significantly different chemical or physical parameters of the respective liquid parts have influence onto the hardening speed of the respective liquid parts.

It is found for example that a good reproduction combined with a long life can be obtained in case the thickness of the liquid parts forming the higher relief sections are significantly, especially at least 50%, larger than the thickness of the liquid parts forming the lower relief sections. That is surprising, because the production of large thickness differences, especially in micro relief structures requires a relatively large pressure to be exerted onto the die structure. From experiments pressures can be derived of hundreds to thousands of atmospheres and pressure gradients of hundreds to thousands of atmospheres per millimeter die surface. It is therefore not surprising that in the known methods and systems for producing micro relief structures these high pressures and the resulting large differences in thickness of the liquid layer, into which the relief structure is formed, are avoided. As is indicated there is especially at least a difference of 50% in thickness, and preferably the difference is 100%. With a relief height of e.g. 0.2 micron, which is a commonly used measure for optically readable discs, 50% thickness difference means that the thin parts of the relief layer may not be thicker than 0.1 micron and that the highest parts of the relief may not be higher than 0.3 micron.

A possible explanation for the increase in the reproduction accuracy and the extension of the die life as result of thickness differences lies in the fact that significant ratio differences between the surface and the volume of the various liquid parts result from said thickness differences, which might lead to a significant difference in hardening speed.

Another possible explanation can be found for liquids which show shrinkage during the hardening stage. If the thickness differences between the thinner and thicker liquid parts are larger, then especially the thicker liquid parts may show a shrinkage which is not supplemented by liquid from the thinner liquid parts. In that case the thicker liquid parts will become released from the die surface during the hardening stage. This release would give the explanation for the improvement of the reproduction accuracy and the extended life of the die.

According to a preferred method the concentration of one of the chemical components, determining the hardening speed of the liquid such as catalyzers or photo-initiators, is significantly, especially at least 50% higher in one of the mentioned liquid parts.

It is found experimentally that preferably, the concentration of the concerning chemical component is higher in the thicker parts. In that case apparently the difference in the hardening speed is the important factor playing a significant role in the improved reproduction accuracy and the extended life of the die surface.

In that case furthermore the hardening liquid will faster and better adhere to the substrate than to the die surface. That advantage applies also to other possible methods within the scope of the invention. It is remarked in this connection that the adherence to the substrate can be improved by pretreating the substrate surface by means of corona-discharges, etching the surface, coating the surface by a film of adhesion improving material, or subject the surface to an ion implantation process.

It has appeared furthermore that with polymer liquids, such as oligomer methacrylate mixtures, which liquids will harden under the influence of ultraviolet radiation, the life of the die can be extended and the reproduction accuracy can be improved in case the intensity of the ultraviolet radiation is significant larger in one of the mentioned liquid parts. Significantly larger means in this respect that the concentration of the hardening electromagnetic radiation is at least 50% higher in the respective liquid part.

It is found experimentally that preferably the intensity of the radiation is in the above mentioned sense higher in those liquid parts forming the higher relief sections.

In other cases it is found that a temperature difference between the thicker and thinner liquid parts have the same positive effect, whereby preferably thermohardening liquids are warmer in the thinner liquid parts and thermoplastical liquids are warmer in the thicker liquid parts.

The realisation of physical or chemical differences between the thinner and thicker liquid parts is not very simple especially not if the relief structures to be reproduced have very small height differences below 100 micron respectively below 1 micron, and a spatial resolution in the same order, for which area however the invention is especially destined.

According to a preferred method the hardenable liquid is deposited between the die surface and the substrate by depositing a first liquid onto the substrate and depositing a second liquid onto the die surface, whereby the chemical or physical parameters of both liquids are different from each other.

Further preferred embodiments of the method according to the invention as well as details of systems for carrying out methods of this type will be discussed hereinafter with reference to the attached drawings.

Figure 1:
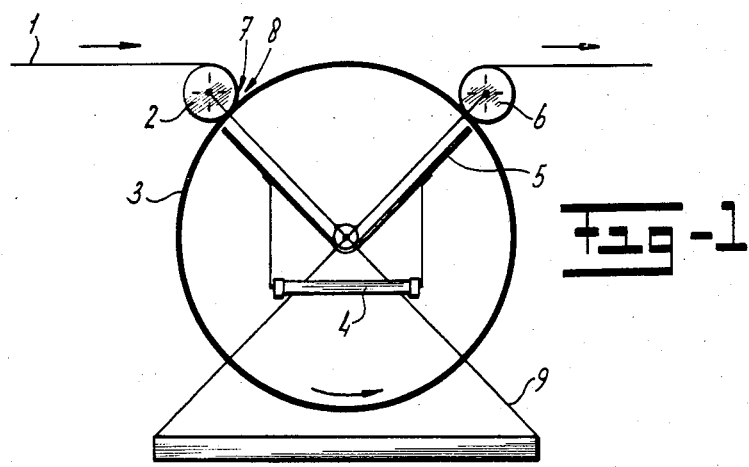
FIG. 1 illustrates a first embodiment of the system according to the invention.

In this system according to the invention, which is schematically illustrated in FIG. 1, a substrate in the form of a tape or web 1 is supplied to the roller 2 which forces the substrate strongly against the die roll 3 carrying the die surface to be reproduced.

The force required for the process is found to be dependent on the following process parameters: roll width b, viscosity of the hardenable fluid h, web speed u, radii of the two pressure rollers r1 and r2, hardness of the roller surfaces and of the web material.

It is found experimentally that the force f should exceed $4 \times 10^6 \times b \times h \times u \times r$ for hard surfaced rollers and thin, stiff web material like 12 micron thick mylar film (trade name of Du Pont). The radius r follows the equation $1/r = 1/r1 + 1/r2$ and the dimensions are given in metrics (kg/m/s).

The viscosity of the fluid should be measured at the high shear rates, noticably over $10^6 \times u$ reciprocal seconds (dimension in metrics).

When the rollers are rubber-clad or when thicker films are used, such as 1 mm thick polycarbonate film, it is found that the required roller force has to be considerably higher, that is over ten times higher then calculated according to the formula above.

In the system according to FIG. 1 both the substrate surface as well as the die surface are wetted with a hardenable liquid by means of not-illustrated wetting means before the substrate and the die are forced together. The wetting means might e.g. in a known way be embodied as rolls rotating in the counter-direction with reference to the movement of the surface to be wetted, elongated extrusion openings covering the width of the surface to be wetted, or a liquid reservoir in the roller nip In the system according to FIG. 1 the hardenable liquid is carried between the rotating die surface and the substrate tape wrapped around the die roller. The die surface in the figure is transparant for ultraviolet radiation and the liquid is hardened by means of ultraviolet radiation emitted by the radiation source 4, which radiation at the upper side is reflected by the reflector 5, so that only the section of the die surface between the pressure roll 2 and the pressure roll 6 is illuminated by ultraviolet radiation. Both the radiation source 4 and the reflector 5 are mounted at fixed positions within the rotatable die roll 3. After hardening the substrate, now carrying the thereto adhering hardened relief structure, is drawn loose from the die surface and is transported further via the pressure roll 6. The die roll 3, the pressure rolls 2 and 6 as well as the light source 4 and the reflector 5 are connected to a supporting frame 9.

In this system the chemical composition of the thicker liquid parts can be made different from the composition of the thinner parts by applying liquids to the surfaces of the substrate respectively the die at 7 and 8 using two liquid supply means, whereby the thickness of each of said liquid layers is larger then the thickness of the relief structure to be produced. In that case two thin laminar liquid layers are brought together in the nip between the pressure roll 2 and the die roll 3, whereby because of laminar adherence at the one surface, the substrate surface relatively much of the one liquid composition will be present whereas relatively much of the other liquid composition will be present near the other surface, the die surface. Experience has proven that the thicker parts of the relief shaped liquid layer comprise relatively more of the composition which was supplied at the die side. The differences will be significant in case the thickness differences between the thinner and thicker liquid parts are relatively large. Preferably, liquids with a low and almost equal viscosity are used and the pressure roller 2 is pressed against the die roll surface 3 with high force according to the formula mentioned above.

An example of a suitable liquid is a mixture of 50 wt. % TPGDA, 44% OTA 480 and 6% DMPA at the substrate side and 50% TPGDA, 50% OTA 480 at the die side. Said mixtures have a viscosity of approximately 75 cP at $10^5 \sec^{-1}$ shearrate. TGPDA and OTA 480 are trade names of the Union Chimique Belge, the chemical formulae thereof are tripropylene glycoldiacrylate and oligotriacrylate with a molecular weight of about 480. The chemical formula of DMPA is 1,1-dimethoxyl-1-vinyl-acetophenone.

Also other common mixtures comprising acrylate monomers and oligomers can be used such as containing N-vinyl-2-pyrrolidone, benzyl-acrylate, tetrahydrofurfirylacrylate or trimethylpropanetriacrylate such as Laronam AR-8496, a product of BASF, VP S 2700 as commercially available from Degusa. Besides acrylates other hardenable polymers can be used such as epoxy resins, polyacrylates and silicones.

The die substrate of the system according to FIG. 1 is transparent for the ultraviolet radiation of the source 4. Preferably, the protuberances of the relief structure, extending from the actual die surface are made of a material which is not transparent for the applied radiation. Suitable materials for these extending parts on the die substrate are chromium, titanium and some kinds of glass such as chalcogenide glass. The die surface itself can be made of quartz, quartz glass or thin plexiglass, whereby the surface structure is inwardly supported by an auxiliary construction forming part of the rotatable roller body.

Figure 2:
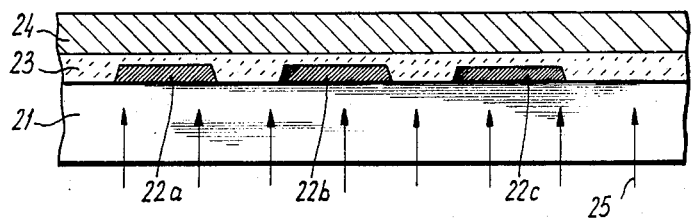
FIG. 2 illustrates a cross-section through the combination of die, liquid layer and substrate.

Such a relief structure is schematically illustrated in FIG. 2. In this figure the transparent roller surface is indicated by 21 whereas the non-ultraviolet light transparent parts of the relief structure are indicated by 22a, 22b, 22c. The hardenable liquid layer is indicated by 23 and the substrate has the reference 24. The ultraviolet radiation 25 is in this configuration almost solely active in the thicker parts of the liquid film. First after chemical diffusion also the parts of the liquid film which are masked for direct radiation will be hardened. It has been found that with liquid compositions which show a shrinkage during the hardening stage, as the abovementioned compositions, the thinner parts of the liquid film are partly transferred to the faster hardening thicker parts of the film. This occurs in a reproduceable way and this shrinkage can be taken into account in the production of the relief structure onto the die surface.

The system according to FIG. 1 can also be used for thermal plastic liquids which in fluid condition are deposited onto the substrate surface and/or the die surface or are present thereon and which harden by cooling during the transport stage from the first pressure roll 2 to the second pressure roll 6. In that case the reproduction accuracy can be increased and the die wear can be decreased if the die surface 21 is relatively cooled and is heatconducting, e.g. because it is made of a metal (in that case the die surface does not have to be transparent for radiation), and the extending parts of the relief structure 22a, 22b, 22c... are made of a relatively heat insulating material, e.g. a plastic such as teflon or glass.

The system is able to process both organic thermoplasts such as polyvinylchloride and polyamide, as well as anorganic thermoplasts, such as solder types for instance tin-lead solder or tin-lead-cadmium solder. Anorganic conducting thermoplasts can be used advantageously for structuring electrical conductors onto flexible prints used in the micro-electronic industry.

In the system of FIG. 1 the desired relief structures are realised onto the substrate web or tape in a continuous way. From these tapes or webs rectangular or round parts can be cut or punched, which parts can be used for instance as (flexible) print or as (flexible) video disc.

It is also possible to use the method according to the invention in a non-continuous process. One has found that also in that case it is advantageous to realise a linear contact between the substrate and the die surface in the above described system and thereafter to maintain a area contact during the hardening stage. In the line contact area high pressures can be exerted which have proven to be advantageous for realising large differences in thickness between the thinner and thicker parts of the relief. It is proven to be advantageous that these higher pressures will not be exerted during the actual hardening process. Preferably, the then exerting overpressure is smaller than 100.000 Pa, especially smaller than 1000 Pa.

In the continuous production process, described with reference to FIG. 1, during the hardening stage the substrate is pressed against the die surface by means of the bow tension in the substrate tape. Said bow tension is in the usual substrate materials much smaller than 1000 Pa, and therewith significantly smaller than the pressure maximum in the nip between the pressure roller 2 and the die roller surface 3.

Examples of suitable substrate materials are: polyethene terephthalate (Mylar from DuPont), polyimide (Kapton from DuPont), polymethylmethacrylate, all eventually in metallized condition, as well as metal bands such as bands of aluminium, titanium or stainless steel. The substrate band may also comprise a number of layers to be distinguished into e.g. a structure carrier and a mechanical supporting layer.

Figure 3:
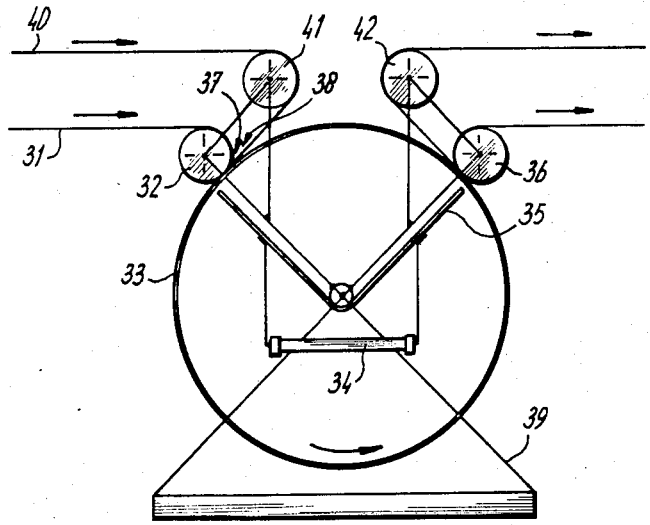
FIG. 3 illustrates a second embodiment of the system according to the invention.

The method according to the invention can also be used for reproducing a relief structure present onto a band shaped die. A system for carrying out such a method is illustrated in FIG. 3.

The carrier band 31 carrying the relief to be reproduced is supplied along the pressure roller 32 to the roller 33, in this case embodied as a smooth roller. A die band 40 is supplied along a roller 41 to the roller 33 and is wound off from the roller 33 along the roller 42. The liquid supply means 37 en 38 are wettening the surfaces of the carrier 41 respectively the die 40 with liquid. In the same way as in FIG. 1 also in this embodiment radiation hardenable liquids can be applied, in which case the radiation source 34 and the reflector 35 are installed under the carrying frame 39. In that case the die band as well as the roller 33 should be at least partly transparent for said radiation, in the same way as is described with reference to FIG. 2.

Just as in FIG. 1 also temperature hardenable liquids or in another way hardenable liquids can be applied in which case the die band and eventually the roller 33 can be adapted in the same way as is described with reference to FIG. 1.

The separation between the die and the substrate is carried out in the neighbourhood of the roller 36, where the substrate is released from the die. The die is thereafter drawn away along roller 42 to a not indicated wind-on reel.

The method and system according to the invention can be used for realising a relief structure for products such as flexible prints, optical gratings, grating lenses, Fresnel lenses, long-play records as well as compact discs, video discs, so-called zero order diffraction dia positives and digital optical films.

These products will be distinguished from similar products made with other methods and in other systems by large differences in the properties of the thinner and thicker relief parts. These differences may be: a significant difference in thickness; a different concentration of catalyzer, photo-initiator, internal release agent, solvent, filling fluids, differences in the polymerization grade or in the polymerization form, in crystallization grade or in crystallization form.

I claim:

1. Method for reproducing relief structures onto a substrate, whereby between a die surface comprising holes or protuberances corresponding to the negative shape of the relief to be reproduced, and a substrate a hardenable liquid is deposited, whereafter the die surface and the substrate are least locally forced together whereby the respective section of the die surface does not move in relation to the substrate in any other direction than perpendicular to the contact surface, whereafter the hardenable liquid hardens during which process there is no mutual movement between the die surface and the substrate both of which remain forced together with a pressure which is smaller than the pressure during the initial pressing stage, and the substrate and the die surface are separated after the liquid is hardened, *characterized in that* there are significant differences in the chemical or physical parameters which have influence onto the hardening process between those liquid parts forming the higher relief parts and those liquid parts forming the lower relief parts.

2. Method according to claim 1, *characterized in that* these significantly different chemical or physical parameters have influence onto the hardening speed of the liquid.

3. Method according to claim 1, *characterized in that* the pressure exerted when the two surfaces are forced towards each other is high enough such that the thickness of the fluid parts forming the higher relief parts is significantly, especially at 50%, larger than the thickness of the fluid parts forming the lower relief parts.

4. Method according to claim, 1 *characterized in that* the substrate and the die surface are forced together according to a contact line and are maintained thereafter in contact with each other, whereby the pressure at the contact line is significantly, respectively at least 10 times larger than the pressure during the contact maintaining stage.

5. Method according to claim 4, *characterized in that* the force required to press the substrate and the die surface together exceeds $4 \times 10^6 \times b \times h \times u \times r$, in which:
b is the width of both surfaces
h is the viscosity of the hardenable fluid
u is the substrate speed
r follows the equation $1/r = 1/r1 + 1/r2$ whereby r1 and r2 are the bending radii of the substrate and the die surface at the contact line position, at the input side.

6. Method according to claim 1, *characterized in that* the relief structure has height differences smaller than 100 micron.

7. Method according to claim 6, *characterized in that* the height differences are smaller than 1 micron.

8. Method according to claim 1, *characterized in that* the concentration of one of the chemical components determining the hardening speed of the liquid, such as catalysts or photo initiators, is significantly, especially at least 50%, higher in one of said liquid parts.

9. Method according to claim 4, *characterized in that* the abovementioned concentration is significantly, especially at least 50% higher in the fluid parts forming the higher relief parts.

10. Method according to claim 1, *characterized in that* the hardenable liquid between the die surface and the substrate is deposited by depositing a layer of a first liquid onto the substrate and depositing a layer of a second liquid onto the die surface, whereby the chemical or physical parameters of both fluid layers influencing the hardening process are different from each other.

11. Method according to claim 1, *characterized in that* the liquid hardens under the influence of electro-magnetic radiation and that the intensity of this radiation is significantly, especially at least 50% higher in one of said liquid parts.

12. Method according to claim 6, *characterized in that* the radiation intensity is in the above indicated way higher in those liquid parts forming the higher relief sections.

13. Method according to claim 1, *characterized in that* the liquid is a thermohardening liquid and that the temperature of those liquid parts forming the lower relief sections is higher than the temperature of those liquid parts forming the higher relief sections.

14. Method according to claim 1, *characterized in that* the liquid is a thermoplastical liquid and that the temperature of those liquid parts forming the lower relief sections is lower than the temperature of those liquid parts forming the higher relief sections.

15. Method according to claim 1, *characterized in that* the relief structure has a spatial resolution smaller than 100 micron.

16. Method according to claim 14, *characterized in that* the spatial resolution is smaller than 1 micron.

17. System for carrying out a method according to claim 1 comprising a reproduction unit in which the substrate and the die surface with the liquid layer in between are forced together respectively are maintained in pressed condition, means for supplying the substrate to the reproduction unit and means for applying the hardenable liquid, *characterized in that* the system comprises a first liquid supply means applying a thin liquid layer to the substrate and second liquid supply means applying a thin liquid layer onto the die surface.

18. System according to claim 17, *characterized in that* at least at the excavation parts of the die relief the die substrate is transparent for electro-magnetic radiation with a wave length between 200 and 2000 nanometers, whereas the extending parts of the relief structure onto the die surface are significantly less, especially at least 50% less transparent for said electro-magnetic radiation.

19. System according to claim 17, *characterized in that* the die surface is a good heat conducter, for instance made out of a metal such as copper, aluminium, or steel, and the extending parts of the relief structure onto the die surface are significantly less heat conducting, for instance made of a non-metal such as a plastic or a non-metallic glass.

20. Carrier with a relief structure made into a method or system described in claim 1, *characterized in that* the physical or chemical parameters respectively properties of the higher relief parts are significantly different from the parameters respectively properties of the lower relief parts, such as e.g. a significant difference in thickness.

21. Carrier with a relief structure made into a method or system described in claim 1, *characterized in that* the physical or chemical parameters respectively properties of the higher relief parts are significantly different from the parameters respectively properties of the lower relief parts, such as e.g. a significant difference in concentration of catalysts or reaction initiators, crystalline structure or crystallization grade; polymerization structure or polymerization grade.

* * * * *